United States Patent [19]
Anderson

[11] 3,826,243
[45] July 30, 1974

[54] BRAINWAVE ANALYSIS AND FEEDBACK METHOD AND APPARATUS

[76] Inventor: Weston Arthur Anderson, 763 La Para Ave., Palo Alto, Calif. 94306

[22] Filed: July 10, 1972

[21] Appl. No.: 270,520

[52] U.S. Cl. .............................. 128/2.1 B, 324/77 A
[51] Int. Cl. ............................................. A61b 5/04
[58] Field of Search .................... 128/2.1 B, 2.06 B; 324/77 A, 77 B, 77 E

[56] References Cited
UNITED STATES PATENTS
3,032,029  5/1962  Cunningham ................... 128/2.1 B
3,621,836  11/1971  Nagatomi ...................... 128/2.1 B
3,641,445  2/1972  Green .............................. 324/77 E FOREIGN PATENTS OR APPLICATIONS
1,207,185  8/1959  France ............................ 128/2.1 B

*Primary Examiner*—William E. Kamm

[57] ABSTRACT

A method and apparatus for minimizing spurious responses in brainwave analysis and feedback instruments. A plurality of Fourier amplitude coefficients of the incoming brainwave signals are determined, and these coefficients are appropriately combined to be representative of certain brainwave states and to suppress noise signals that have a relatively wide bandwidth.

14 Claims, 5 Drawing Figures

INVENTOR
Weston Anderson

BRAINWAVE ANALYSIS AND FEEDBACK METHOD AND APPARATUS

BACKGROUND OF THE INVENTION

The present invention relates generally to low frequency wave analysis and more particularly to brain wave analyzers. Brain wave signals have been found to be an extremely useful tool for the diagnosis of certain diseases, and for the study of various states of consciousness of healthy animals. In the study of certain diseases and functional disorders of the brain an electroencephalogram (EEG) is commonly recorded. This EEG is obtained by sensing and recording simultaneously a plurality of signals arising from various parts of the brain. A concise review of the clinical implications of electroencephalography is given in the book, "Medical Electroencephalography," by Frederic A. Gibbs and Erna L. Gibbs, Addison-Wesley Publishing Company, Inc., 1969. The recorded signals of such EEG apparatus are extremely complex waveforms, and medical diagnosis from such recordings is normally done by skilled personnel who have had several years of specialized medical training.

It has been found that certain states of consciousness are associated with brain waves in which certain frequency components dominate. A summary of earlier work regarding these states is given by W. Grey Walters in his book, "The Living Brain," W. W. Norton and Company, 1963 and 1953. For example, humans in their normal wide awake state—called beta state—normally exhibit brain waves over a frequency range of from about 12 to 30 Hz. Humans in a relaxed state, with their eyes closed, usually exhibit relatively strong brain waves in the frequency range of 8–12 Hz. This state of consciousness is called the alpha state and the brain waves produced in such state are called alpha waves. For humans in light sleep, brain waves in the range of 6 to 8 Hz are typically produced and these waves are called theta waves. In deep sleep humans typically produce waves in the range of 1 to 4 Hz and these waves are called delta waves.

Joseph Kamiya, Psychology Today, Vol. 1, pages 57–60, April, 1968, has shown that if a person receives external feedback information when certain brain waves are being produced he can learn to discern between certain brain wave states. Furthermore he showed that with the aid of feedback information as to when the alpha wave state is present, many people can learn to control their brain wave states, either emitting or suppressing alpha waves in accord with their will.

Such experiments on trained self-control of alpha waves has been confirmed by Barbara B. Brown, Psychophysiology, Vol. 6, No. 4, pages 442–452, January, 1970. Many subjects have described the alpha wave state as one in which the mind is tranquil, calm and alert, often associated with a pleasant feeling. Devices to facilitate these experiments are called alpha feedback instruments. Typically prior art alpha feedback instruments consist of a sensing means, a means of determining the Fourier amplitude coefficient of a desired frequency component, and a means of displaying or indicating the Fourier amplitude.

A major problem with these prior art devices is that they produce spurious responses due to several different factors including electrode movement, electromyograph signals from muscles, and noise signals generated externally or in the amplifier. A further problem with these prior art devices is that they are difficult to operate because they require critical adjustments of the signal gain because the amplitude of brain wave signals is dependent upon the location of the sensing electrodes and upon the subject.

SUMMARY OF THE INVENTION

The disclosed invention improves the performance of brain wave analysis and feedback instruments by determining a plurality of Fourier amplitude coefficients of a brain wave signal, combining said Fourier amplitude coefficients in a predetermined linear combination to form a composite coefficient, and producing an output signal responsive to said composite coefficient.

Accordingly, it is the object of the invention to provide brain wave analysis and feedback which is indicative of certain brain wave states and which minimizes spurious responses that may arise from electrode movements, muscle potentials, or noise generated either internally or externally.

Another object of the invention is to provide simplified operation of the brain wave feedback instrument so that it can be used and operated by persons without a high degree of prior training. A feature of the invention is that critical adjustments of signal gain are eliminated by providing feedback responsive to predetermined linear combinations of Fourier amplitude coefficients rather than to the amplitude of a single Fourier component as was done in the prior art.

Other attendant advantages and features of the invention will become apparent from the following description when taken in conjunction with the drawings.

BRIEF DESCRIPTION OF THE DRAWINGS

FIG. 3 part *b* illustrates a processed brain wave signal at one point in the embodiment of FIG. 2.

FIG. 3 part *c* illustrates a processed brain wave signal occurring at another point in the embodiment of FIG. 2.

FIG. 3 part *d* illustrates a processed brain wave signal obtained by a combining of the signals of parts *b* and *c*.

DETAILED DESCRIPTION OF THE INVENTION

Figure 1:
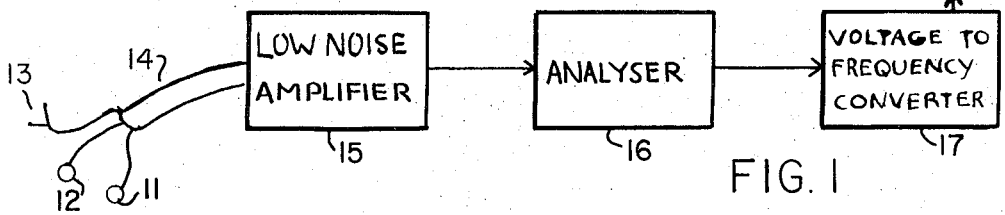
FIG. 1 is a schematic diagram of a prior art brain wave feedback instrument.

With reference to the block diagram designated Prior Art, FIG. 1, sensing of brain wave signals is achieved by contacting the brain area or scalp of a human subject with two sensing electrodes, 11, 12, and usually a ground electrode, 13. The ground electrode is used to minimize common mode signals. Usually the ground electrode, 13, is clipped to another part of the human, i.e., to an ear, or alternatively one of the sensing electrodes, 11 or 12, could be clipped to an ear. Normally an electrode cream is used to make improved electrical contact between the electrodes and the ear or scalp.

The sensing electrodes, 11 and 12, and the ground electrode, 13, are connected to the input of a low noise amplifier, 15, through a cable, 14. A typical voltage gain of this amplifier is 1,000 and a typical frequency response is from about 1 to 100 Hz. These parameters are not critical as the overall gain can be adjusted at many different points in the circuit and the bandwidth is critically determined by the analyzer.

The output of the low noise amplifier, 15, is connected to the input of the analyzer, 16. The analyzer typically consists of a bandpass filter and amplifier followed by a diode rectifier and a low pass filter. In an instrument designed to produce alpha wave feedback the bandpass filter would be centered at approximately 10 Hz and the signal response typically might be 6 db down at 8 Hz and 12 Hz. The design of such bandpass amplifiers are described in Chapter 10 of "Vacuum Tube Amplifiers," by G. E. Valley, Jr. and H. Wallman, McGraw Hill Book Company, 1948. Some examples of such filter-amplifiers using solid state integrated circuits can be found in Chapter 8 of "Operational Amplifiers," McGraw Hill Book Company, 1971. The low pass filter following the diode rectifier might consist of a resistance-capacitance combination with a 1 second time constant.

The output of the analyzer, 16, is connected to the input of the indicator unit, consisting of the voltage to frequency converter, 17 and earphones, 18. This indicator unit provides an audio frequency tone feedback signal, the pitch of the tone representing the strength of the alpha brain wave signal.

Many types of indicator units could be used which would provide the subject with feedback through visual means, aural means, sense of touch, or temperature. A relay controlled by the alpha brain wave signal as described in an article by Elio Pasqualis, Psychophysiology, Vol. 6, No. 2, pages 207 and 208, 1969, could be used to activate any one of these indicator means. The circuit diagram in the Pasqualia article discloses the elements of the analyzer, 16, i.e., the bandpass filter, the rectifier, and low pass filter. In a typical system the voltage gain of the low noise amplifier might be 1,000, with another factor of 100 gain in the analyzer, and a threshold level of approximately 2 volts in the indicator unit. In such a system an alpha wave with an amplitude of 20 microvolts or greater would activate the feedback indicator means.

Figure 3:
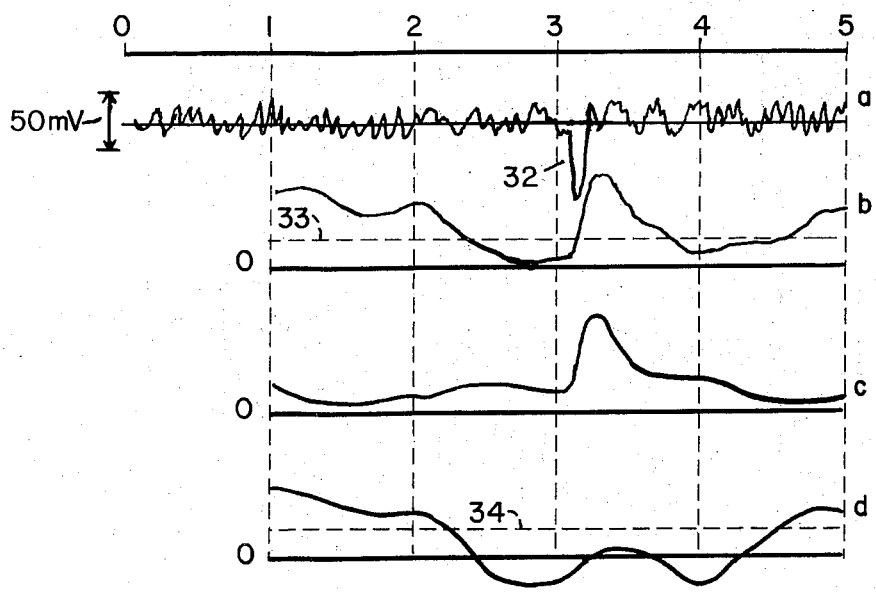
FIG. 3 part *a* illustrates a typical brain wave signal voltage.

A typical brain wave signal from the output of the low noise amplifier, 15, is represented by FIG. 3 part a. The vertical bar at the left of FIG. 3 part a gives a voltage reference scale of 50 millivolts for the case of a low noise amplifier with a voltage gain of approximately 1,000, and the scale at the top of FIG. 3 gives the time in seconds. The sharp spike-like signal, 32, represents a spurious signal arising from electrode movement or the like. I have determined that this spurious signal contains frequency components over a relatively wide bandwidth. It is this wide bandwidth of the spurious signal that permits effective discrimination, as is described below.

The signal output of the analyzer, 16, is illustrated in FIG. 3 part b. Whenever this signal level is above a threshold level, 33, then the display unit is activated and feedback is provided to the subject. In the illustration FIG. 3 part b feedback is produced not only by the alpha brain waves of the subject but also by the voltage spike, 32, that may be caused by an electrode movement or the like.

I have discovered that feedback responses are activated in these prior art brain wave feedback instruments by electrode movements, electromyographic signals and other sources of external and internal noise. These feedback responses are confused with the proper brain wave responses so that an unreliable indication is obtained of the true brain wave state.

Figure 2:
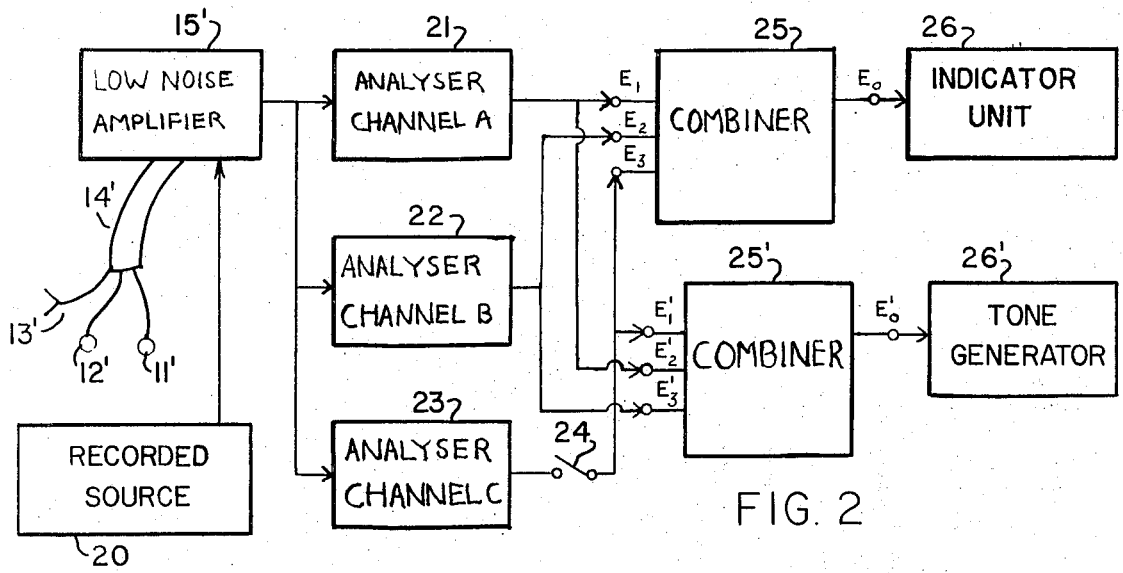
FIG. 2 is a schematic diagram of a brain wave feedback instrument in accordance with the present invention.

FIG. 2 is a block diagram of the present invention. The analyzer, 16, of FIG. 1 is replaced by the plurality of analyzer channels 21, 22 and 23, and combiner, 25. The signal output from the low noise amplifier, 15', is coupled to the inputs of the analyzer units, 21, 22 and 23. Each analyzer unit contains a bandpass filter centered at one particular frequency. In the examples considered below, analyzer channel A, 21, is centered at 10 Hz, analyzer channel B, 22, is centered at 15 Hz, and analyzer channel C, 23, is centered at 7.5 Hz. The bandwidth of each filter is typically between 1 and 6 Hz, and the voltage gain at the band center might typically be a factor of 100. Each analyzer channel, 21, 22 and 23, contains such a bandpass filter coupled to a rectifier followed by a low pass filter with a time constant in the range of 0.1 to 2.0 seconds. The signal output of each analyzer channel corresponds to a Fourier amplitude coefficient of the brain wave signal. The output of analyzer channels 21, 22 and 23 are connected to the inputs $E_1$, $E_2$, and $E_3$, respectively, of combiner, 25. The combiner, 25, mixes the signal inputs $E_1$, $E_2$, and $E_3$ in a linear way to yield an output signal at $E_o$ which is connected to the input of the indicator unit, 26. The sensing electrodes, 11' and 12', the ground electrode, 13', and the low noise amplifier, 15', are the same as and serve the same functions as in FIG. 1. The indicator unit, 26, in one embodiment consists of the voltage to frequency converter, 17, and earphones, 18 of FIG. 1.

Figure 4:
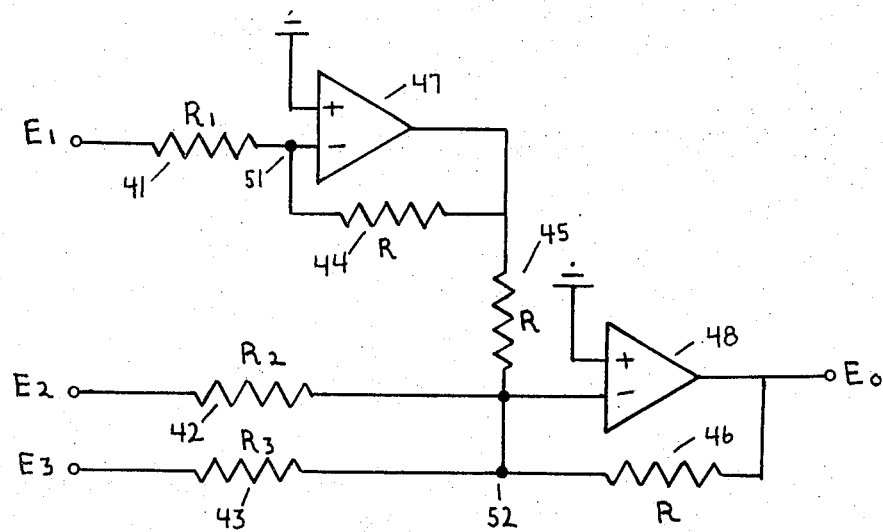
FIG. 4 is a schematic diagram of the preferred combiner of the present embodiment.

In a preferred embodiment the combiner, 25, is constructed as shown in schematic diagram FIG. 4. This combiner consists of two high gain operational amplifiers, 47 and 48, which employ negative feedback to stabilize their gain. Amplifiers, 47 and 48, might typically be Fairchild Model $\mu$A741. A description of such adder circuits is given in "Handbook of Operational Amplifier Applications," First Edition, page 59, Burr-Brown Research Corporation, 1963. The output signal, $E_o$, of the combiner illustrated in FIG. 4 is given by $$E_o = R (E_1/R_1 - E_2/R_2 - E_3/R_3).$$

In this operation $R_1$ is the resistance value of resistor 41, $R_2$ is the resistance of resistor 42, $R_3$ is the resistance of 43, and R is the common resistance of resistors 44, 45 and 46. Additional non-inverting inputs are readily added by attaching additional input resistors to junction 51, and additional inverting inputs are readily added by attaching additional input resistors to junction 52. A typical value for the resistance R is 10,000 ohms. The multiplicative ratios controlling the relative amplitudes of the Fourier amplitude coefficients to be combined is determined by the ratio of resistances of $R_1$, $R_2$ and $R_3$ in the way specified by the above equation. The output signal $E_o$ is thus a linear combination of the input signals $E_1$, $E_2$, and $E_3$.

Figure 5:
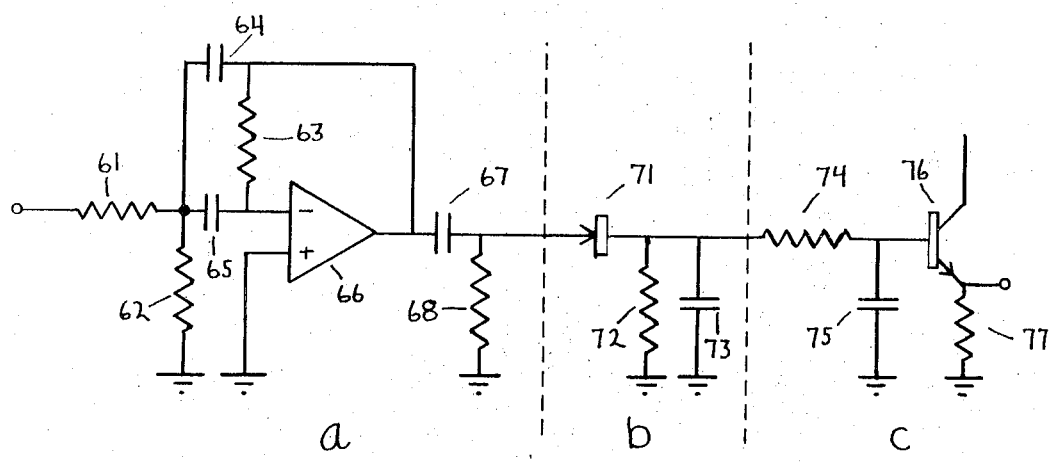
FIG. 5 is a schematic diagram of one of the analyzer channels of the preferred embodiment.

Referring to FIG. 5 there is shown a circuit diagram for one of the analyzer channels, 21, 22 or 23, of FIG. 2 used to determine one Fourier amplitude coefficient.

The first section, FIG. 5 part *a*, is a bandpass filter. The values of the resistors, 61, 62, 63, and capacitors, 64, 65, are chosen by well known design formula, given for example in the book "Operational Amplifiers Design and Applications," McGraw Hill Book Company, 1971, pages 291–295. These values are chosen to provide the desired center frequency, gain, and bandwidth. The operational amplifier, 66, has an open loop voltage gain in the range of $10^3$ to $10^6$, the Fairchild type $\mu$A741 being one of a number of suitable amplifiers. The capacitor, 67, and resistor, 68, provide an a.c. coupling to the detector stage, FIG. 5 part *b*.

The detector FIG. 5 part *b* is comprised of the diode rectifier, 71, and the resistor, 72, and bypass capacitor, 73, coupled in the conventional way.

The output of the detector stage is coupled to low pass filter, FIG. 5 part *c*. This filter is a conventional R.C. filter consisting of a resistor, 74, and capacitor, 75, and has a time constant which is the product of these two values. A typical value of this time constant is between 0.1 and 2.0 seconds. Care must be taken so that the resistance of resistor, 74, is large compared to the resistance of resistor, 72. This low pass filter is coupled through an emitter follower circuit consisting of transistor, 76, and resistor, 77, to the combiner circuit. The emitter follower is used to isolate the low pass filter from the low input impedance of the combiner circuit.

Consider first the case where only two analyzer channels are used, as is represented in FIG. 2 with the switch, 24, open so the output of analyzer channel C, 23, is not connected to the combiner, 25. With the input signal as illustrated in FIG. 3 part *a*, analyzer channel A, 21, having a band centered on 10 Hz, will have an output as illustrated in FIG. 3 part *b*, and analyzer channel B, 22, having a band centered at 15 Hz, will have an output signal as illustrated in FIG. 3 part *c*. The bandwidth of each analyzer channel is typically 2 Hz. With the combiner of FIG. 4 with resistances $R_1 = R_2 = R$ used for combiner, 25, of FIG. 2, the signal output of analyzer channel B, 22, is subtracted from the signal output of analyzer channel A, 21, to get a combined output signal illustrated in FIG. 3 part *d*. The indicator unit is now activated whenever the output level of the combiner is above the threshold level, 34, of the indicator unit. The spurious signal, 32, illustrated in FIG. 3 part *a* has sufficient bandwidth to produce outputs in both analyzer channel A and analyzer channel B, so that when they are subtracted in the combiner, 25, the indicator unit is not falsely activated. Only the true alpha signal in this case activates the indicator unit.

Another feature of this embodiment is that only the desired Fourier component produces an output signal from the indicator unit, 26, if it is dominant. This is achieved by setting the threshold of the indicator unit, 26, as illustrated by level 34 in FIG. 3 part *d* very close to the zero level. The indicator unit, 26, then produces a feedback response whenever the output of the combiner, 25, is positive which occurs only if the 10 Hz Fourier amplitude coefficient is greater than the 15 Hz Fourier amplitude coefficient of the brain wave signal. The overall voltage gain of the low noise amplifier and analyzer combinations ddo not need to be readjusted for individual subjects who may have brain waves of different amplitudes, or if the sensing electrodes, 11' and 12', are applied at different places on the scalp.

Consider now the case where switch, 24, of FIG. 2 is closed so that the combiner 25, receives inputs from all three analyzer channels, 21, 22 and 23. In one preferred embodiment the signal from analyzer channel A, 21, having a band centered at 10 Hz and with an amplitude coefficient of +1.0 is combined with the signals from analyzer channels B, 22, having a band center at 15 Hz, and C, 23, having a band center at 7.5 Hz both with an amplitude coefficient of –0.5. The bandwidth of each channel is typically 2 Hz. The above amplitude coefficients are achieved by selecting resistors $R_1 = R$ and $R_2 = R_3 = 2R$ in the combiner circuit of FIG. 4. With this combination of resistances a more nearly perfect cancellation of wideband noise components is obtained because Fourier components both above and below the 10 Hz region of interest are subtracted from those Fourier components of the desired region. Neither signal components nor noise components with frequencies outside the bandpass of analyzer channel A, 21, will falsely activate the indicator unit, 26.

In the above examples alpha wave response was provided by the instruments described. The technique can be equally well applied to achieve theta wave response by connecting the inputs of the combiner of FIG. 4 as described in the following embodiment. The low noise amplifier 15' and analyzer channels, 21, 22, 23, are identical to those of the immediately preceding embodiment. The combiner and indicator unit are connected in a way illustrated by the connections of FIG. 2 with combiner 25' replacing combiner 25 and tone generator 26' replacing indicator unit 26. The output of analyzer channel A, 21, is connected to combiner input $E_2'$, output of analyzer channel B, 22, is connected to combiner input $E_3'$, and output of analyzer channel C, 23, is connected to combiner input $E_1'$ of combiner 25'. The resistance values $R_1 = R$, and $R_2 = R_3 = 2R$ are used in the circuit of FIG. 4 for the combiner 25' of FIG. 2. With these connections the combiner output $E_o'$ will activate the tone generator, 26' when brain waves in the theta region are received. Tone generator 26' in one embodiment consists of the voltage to frequency converter 17 and earphones 18 of FIG. 1. Other indication devices including visual indicators could be used in place of tone generator 26'.

Another preferred embodiment provides a plurality indication of alpha and theta wave responses using the two combiners 25 and 25' and the indicator unit 26 and tone generator 26' each connected as described in the two previous embodiments and shown in FIG. 2 with both combiners 25 and 25' and both indicator 26 and tone generator 26 operated simultaneously. The indicator unit 26 responds to alpha wave frequencies and may, for example, provide a tone of one fixed pitch, 400 Hz when the output of combiner 25 is positive, and tone generator 26' responds to theta wave frequencies and may provide a tone of another pitch, 1,000 Hz for example, when the output of combiner 25' is positive.

Although this invention has been disclosed and illustrated with certain brain wave frequencies it is apparent that the principles disclosed here apply to the analysis and indicating the presence of other brain wave frequency combinations. The method has been illustrated with electronic analog computing apparatus, however the method could equally well be carried out by digitizing the incoming brain wave signals and performing the operations described here by suitably programming a general purpose digital computer to carry out the same computations, and activate a suitable indicating device to provide feedback. Although one of the main purposes of this invention is to provide improved brain wave feedback instrumentation, it can be used to minimize or eliminate spurious signals when analyzing brain wave signals directly or analyzing those that have been recorded at an earlier time, as indicated by recorded source 20 of FIG. 2. Since many changes will be apparent to persons skilled in the art, the invention is to be limited only as indicated by the scope of the appended claims.

I claim:

1. The method of analyzing the brain wave signal of an animal comprising the steps of:
   a. sensing said brain wave signal,
   b. determining a plurality of Fourier amplitude coefficients of said brain wave signal,
   c. combining said Fourier amplitude coefficients to obtain a composite coefficient representative of a brain wave state, and
   d. indicating said brain wave state.

2. The method as claimed in claim 1 wherein the step of sensing comprises the steps of sensing said brain wave signals and amplifying said brain wave signals.

3. The method of claim 1 wherein the step of sensing said brain wave signals comprises the steps of sensing previous recorded brain wave signals and amplifying said recorded brain wave signals.

4. The method of claim 1 wherein said step of determining a plurality of Fourier amplitude coefficients comprises determining two Fourier amplitude coefficients and said step of combining said Fourier amplitude coefficients comprises multiplying one of said Fourier amplitude coefficients by a constant factor to obtain a resultant factor and adding said resultant factor to the other of said Fourier amplitude coefficient to obtain said composite coefficient.

5. The method of claim 4 wherein said constant factor is minus one.

6. The method of claim 1 wherein the step of indicating said brain wave state comprises generating an audio frequency sound responsive to said composite coefficient.

7. The method of claim 1 wherein the said step combining said Fourier amplitude coefficients to obtain a composite coefficient comprises the forming of a plurality of said composite coefficients, each representative of a certain brain wave state.

8. Apparatus for analyzing the brain wave signal of an animal comprising:
   a. means for sensing said brain wave signal,
   b. means for determining a plurality of Fourier amplitude coefficients from said brain wave signal,
   c. means for combining said Fourier amplitude coefficients to form a composite coefficient representative of a brain wave state, and
   d. means for indicating said brain wave state responsive to said composite coefficient.

9. Apparatus according to claim 8 wherein the means for sensing comprises means for sensing said brain wave signal and means for amplifying said brain wave signal.

10. Apparatus according to claim 8 wherein said means for sensing said brain wave signal comprises means for sensing a previously recorded brain wave signal and means for amplifying said brain wave signal.

11. The apparatus of claim 8 wherein means for determining a plurality of Fourier amplitude coefficients comprises the means for determining two Fourier amplitude coefficients and means for combining said Fourier amplitude coefficients comprises means for multiplying one of said Fourier amplitude coefficients by a constant factor to obtain a resultant factor and means for adding said resultant factor to the other of said Fourier amplitude coefficient to obtain said composite coefficient.

12. The apparatus of claim 11 wherein said constant factor is minus one.

13. The apparatus of claim 8 wherein said means for indicating comprises an audio frequency sound generating means responsive to said composite coefficient.

14. The apparatus of claim 8 wherein said means for combining said Fourier amplitude coefficients to form a composite coefficient comprises a means for forming a plurality of composite coefficients, means for forming each of said composite coefficients including a separate combining means, each of said separate composite coefficients representative of a certain brain wave state, and said indicating means comprises means for providing plural indications, each indication representative of a certain brain wave state.

* * * * *